Jan. 3, 1928. 1,655,247
P. SCHILOVSKY
GYROSCOPIC NAVIGATIONAL APPARATUS
Filed April 14, 1924 3 Sheets-Sheet 2
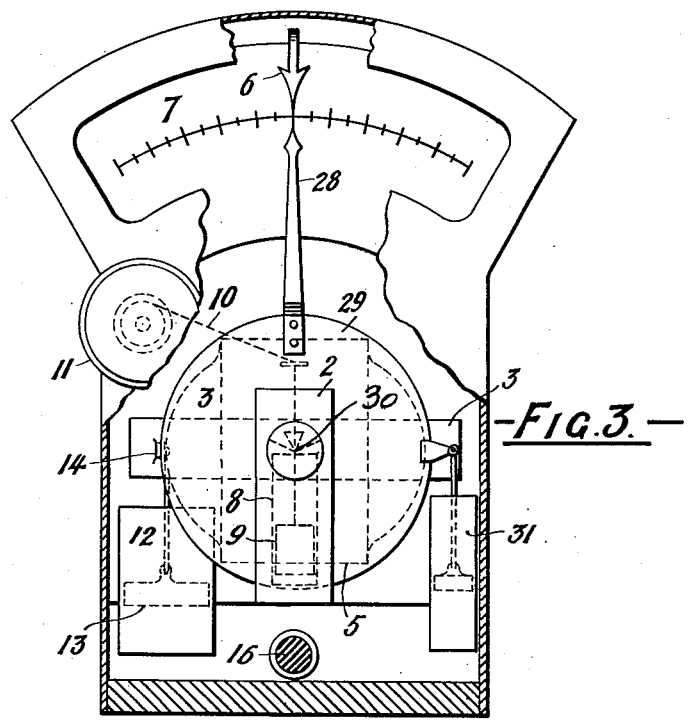
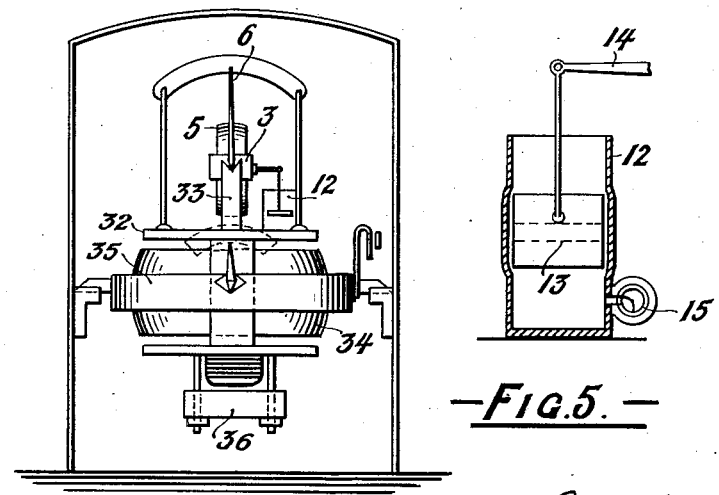

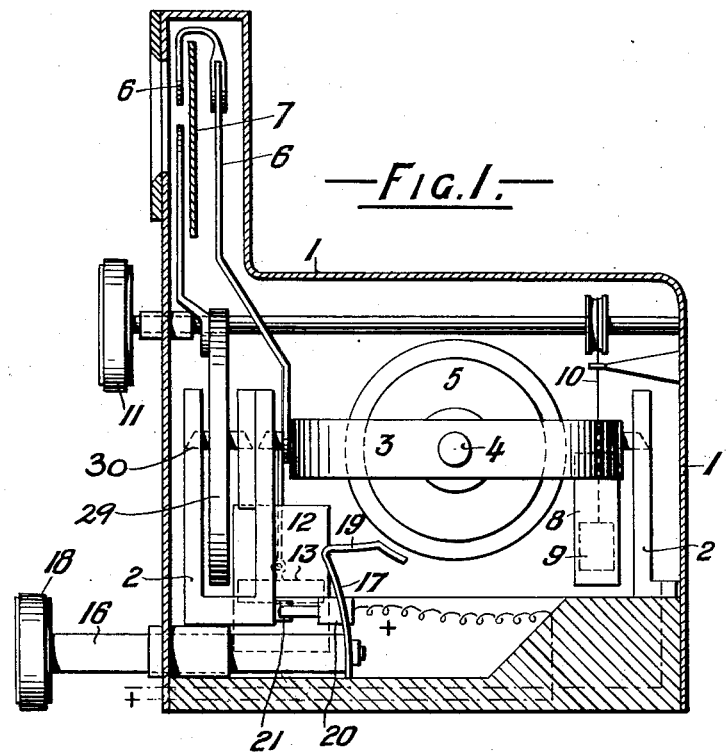

Patented Jan. 3, 1928.

1,655,247

UNITED STATES PATENT OFFICE.

PETER SCHILOVSKY, OF LONDON, ENGLAND.

GYROSCOPIC NAVIGATIONAL APPARATUS.

Application filed April 14, 1924, Serial No. 706,384, and in Great Britain May 18, 1923.

This invention relates to a gyroscopic instrument for navigation purposes suitable for use on aeroplanes, ships and the like, whereby deviation from the straight course will be indicated to the pilot or steersman with great precision.

The principle object of this invention is to record and signal by large inclinations of the pointer of the instrument the imperceptible to the eye slow angular velocities of curves of the given body, whilst its yawings and ocillations, i. e. displacements of considerable angular velocity but of short duration are left unnotified by the instrument; further object is to obtain great precision in gyroscopes revolving at slow speed and requiring only minute power; the whole instrument being unaffected by rolling and pitching of ships and aircraft.

To obtain the above results the principles of construction of the instrument are (1) to mount the frame of the gyroscope so that it is free to maintain its position with the minimum of friction deranging effect, (2) that its movements relatively to the aeroplane or other craft may be damped with the minimum of friction resistance, (3) that its centre of gravity very nearly coinciding with the points of support may be adjusted during operation, (4) that the major weight and larger diameter of the gyroscope is contained in the rotary part, and (5) that a steady platform may be provided for the gyroscopic instrument when placed on ships or other vessels where subsidiary movements have to be eliminated in order to enable the angular movement sought to be indicated to be measured without interference.

In an instrument constructed according to this invention the gyro-wheel is constituted by or comprises the field magnet system of a direct current motor having a stationary armature and commutator, the gyroscope frame being carried on knife-edge pivots and controlled by a substantially frictionless dashpot device, either pneumatic or liquid, adapted to oppose gyroscopic reactions due to sharp or sudden changes of direction, the fluid resistance of such dashpots being controllable by the operator. Also the sensibility of the gyroscope according to this invention is varied by changing its centre of mass by means of a weight, movable under control of the operator.

The invention will now be more particularly described with reference to the accompanying drawings, wherein an example of construction of an instrument suitable for use on an aeroplane is shown at Figs. 1, 2 and 3, which figures show such an instrument in vertical section, sectional plan, and front elevation partly in section.

Figure 6:
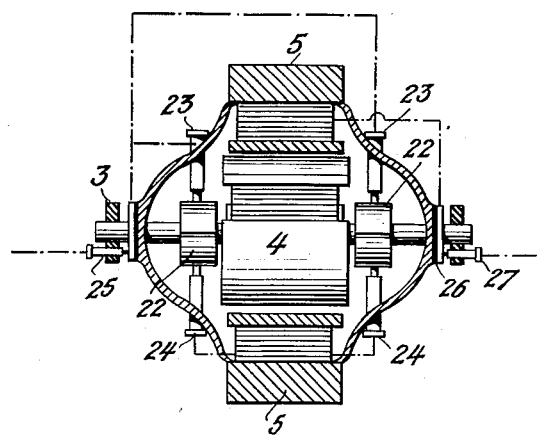
Figure 7:
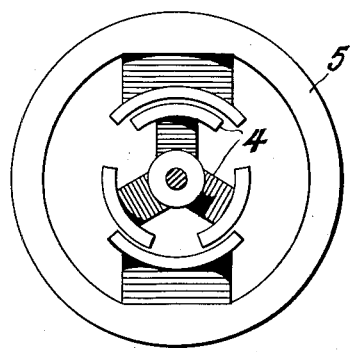

Fig. 4 is a diagrammatic view of a gyroscopic apparatus for use on ships; Fig. 5 is a detail view showing in vertical section a pneumatic dashpot; and Figs. 6 and 7 are detail views of the gyro-wheel and armature shown at Fig. 1.

Referring more particularly to Figs. 1, 2 and 3, within a case 1 is fixed a frame 2 formed with bearings to carry the gyroscope frame 3, which is mounted on knife edges. Carried by the gyroscope frame 3 is the armature 4, and rotatably mounted on the armature spindle is a gyro-wheel 5.

Also carried by the frame 3 is a pointer 6 which is prolonged vertically and projects over a scale 7 mounted in the casing. Also carried by the frame 3 and depending below its pivots is a cylinder or pocket 8, within which is a weight 9 depending from a cord 10 which passes over a pulley capable of being rotated by a shaft controlled by a handwheel 11, whereby the weight 9 can be lowered or raised to increase or decrease respectively its gravitational control of the frame 3.

In order to prevent such an apparatus from being affected by sudden sharp movements or vibrations, a restraining means is provided in the form of a dashpot. This restraining means consists of a cylinder 12 (see Fig. 5) within which is a piston 13 loosely fitting, so that there is no friction between the periphery of the piston and the cylinder walls; the rod carrying this piston is pivotally attached to an arm 14 projecting from the frame 3, see Fig. 2. This cylinder 12 is so formed that for a distance about centrally of its length it is of larger internal diameter, with the result that when the piston arrives at the enlarged portion there is less resistance and a freer and quicker movement of the piston. The resistance to movement of the piston may be somewhat regulated and controlled by means of a valve 15 which admits a lesser or greater quantity of air into the cylinder and alters the yielding capacity of the dashpot against a sudden displacement of the piston.

There are two different sensitiveness controls of the apparatus whose regulation by the pilot himself are desirable; that which is purely gyroscopic and that which is mechanical. The weight 9 which may be lifted or lowered by manual adjustment of the pilot increases or decreases the gravitational control and therefore increases or diminishes the gyroscopic sensitiveness of the apparatus, while the restraining device Fig. 5, by operation of the valve 15, permitting of a lesser or greater admission of air to the cylinder, alters the yielding capacity of the dashpot against sudden displacement of the gyroscope—caused by yawing movements of the progressing body.

A stopping mechanism for the gyroscope is provided in this instrument, by the actuation of which the gyroscope and its frame will be raised off the knife edges and at the same time the electric circuit will be broken and the gyroscope brought to rest.

As shown in Fig. 1 this stopping device comprises a sliding rod 16 carrying at its inner end a support 17 so shaped that upon sliding the rod by means of its handle 18 the support will contact with the periphery of the gyro-wheel 5, and upon further sliding movement of the rod the gyro-wheel and its frame 3 will be raised and supported, the gyro-wheel resting in a suitably shaped recess 19 formed in the support 17. During this sliding movement of the rod 16 the electric circuit will be broken by the contacts 20 and 21 separating.

The gyroscope of the apparatus has no special disc rotated by a motor system, but the electro-magnet of a motor is cast in the form of a ring and forms the gyro-wheel 5, while the armature 4 is held stationary in the gyroscope frame 3.

As shown in Figs. 6 and 7, it is sufficient to have only three sections in the armature windings and in the commutator but it is desirable, as shown in Fig. 6, to provide the armature with two identical commutators 22, and two pairs of brushes 23 and 24 carried by the gyro-wheel, to ensure perfect working of the gyroscope.

As indicated in Fig. 6, the current for driving the gyroscope is introduced, by a brush 25 carried by the frame 3, to an insulated disc carried by the gyro-wheel 5, the current being led from this disc by way of the brushes 23 to the commutators 22, to the armature windings, and thence by the brushes 24 through the electro-magnet of the gyro-wheel, from which it is led finally to an insulated disc 26 and through a brush 27.

In an instrument as above described it is found desirable to have an indicator 28 carried by a disc 29 suspended on knife edges 30 so arranged that the indicator 28 is kept vertical by gravity. The movements of the disc 29 are also damped by a dashpot device 31 of similar construction to that already described and shown at Fig. 5 of the drawings.

In adapting an instrument such as above described for use on ships or large aeroplanes, or vehicles which are subject to rolling and pitching, it is necessary to mount the gyroscopic apparatus upon a platform 32 which shall not be affected by pitching or rolling. In Fig. 4 such an arrangement is shown, the gyroscope 5 being mounted in the frame 3 which is carried on knife edges by the standards 33 on the platform 32, which platform is supported on the first frame of a three-gimbal gyroscope 34, the two first frames being pivoted on knife edges in slightly stable equilibrium. Such a construction allows the axis of the gyroscope 34 to maintain a steady vertical direction in space, disregarding the angular movement of its frame 35 and those of the ship or body to which it is attached due to rolling and pitching.

The practice has shown, that such a platform keeps very long its primary horizontal plane, but the following measures may be applied to ensure its steadiness. A movable weight 36 depends from the gyroscope frame, which weight is arranged to be raised, when the gyroscope 5 indicates a curved course, by means of an electrical device (not shown), and transforms the stable equilibrium of the system into neutral equilibrium; the gyroscope is therefore not affected by centrifugal force on curves and develops no precession when moving on them. When again on the straight course the indicator 6 resumes its zero position and the weight again falls, rendering the equilibrium again stable.

The pitching and rolling of the ship or body to which such an instrument is attached will have no reaction on the instrument owing to the action of the gyroscope 34 upon the platform 32, while any angular displacement in a horizontal plane is followed by the platform 32 and is recorded upon the dial by the pointer 6, through the energetic movements of the gyroscope 5.

What I claim as my invention and desire to secure by Letters Patent is:—

1. In a navigational instrument a compound pendulum comprising a frame having knife edge supporting trunnions, and a gyroscopic wheel of low speed mounted in said frame on bearings at right angles to the frame supporting knife edge trunnions, said knife edge trunnions being only slightly above the centre of mass of the said compound pendulum so as to apply thereto a small gravitational control.

2. In a navigational instrument a compound pendulum comprising a frame having knife edge supporting trunnions and a gyroscopic wheel of low speed mounted in said frame on bearings at right angles to the frame supporting trunnions, electrical driving means for said gyroscopic wheel and means for lifting the frame to raise the knife edge trunnions off their supports, said means being automatically operative when the supply circuit of the electrical driving means is interrupted.

3. In a navigational instrument a compound pendulum comprising a frame having knife edge supporting trunnions and an electrically driven gyroscopic wheel of low speed mounted in said frame on bearings at right angles to the said frame supporting trunnions, said knife edge trunnions being only slightly above the centre of mass of the said compound pendulum, a switch controlling the circuit of the electric motor driving the gyroscopic wheel and means automatically operative upon opening said switch to raise the said compound pendulum off its support.

4. In a gyroscopic apparatus for navigational purposes a compound pendulum comprising a frame having knife edge supporting trunnions and a gyroscopic wheel of low speed mounted in said frame on bearings at right angles to said trunnions, and means for damping momentary oscillations of said compound pendulum.

5. In a gyroscopic apparatus for navigational purposes, a compound pendulum comprising a frame having knife edge supporting trunnions and a gyroscopic wheel of low speed mounted on said frame in bearings at right angles to said trunnions, said knife edge supporting trunnions being only slightly above the centre of mass of said compound pendulum, and a direct current motor with rotating field magnet system for driving said gyroscopic wheel.

6. In a gyroscopic apparatus for navigational purposes, a compound pendulum comprising a frame having knife edge supporting trunnions and a gyroscopic wheel of low speed mounted on said frame in bearings at right angles to said trunnions, said knife edge supporting trunnions being only slightly above the centre of mass of said compound pendulum, a direct current motor with rotating field magnet system for driving said gyroscopic wheel, and means automatically operative upon the circuit of said motor being broken to raise the said compound pendulum off its supports.

7. In an instrument of the character described, a frame having knife edge pivots, a low speed gyroscope wheel and switch controlled means for rotating the same, the gyroscope wheel being supported on the knife edge pivots of the frame, a power controlling switch for starting and stopping the gyroscope wheel, a reciprocating element arranged tangentially with respect to the gyroscope wheel and adapted to operate the switch, and means carried by the reciprocating member adapted to engage the periphery of the gyroscope wheel to lift the wheel and its supporting frame off the knife edge bearings of the latter, the withdrawal of said member operating to rotate the gyroscope wheel while lowering it, to give same an initial start.

8. A gyroscopic apparatus for navigation purposes adapted to indicate the smallest deviation from the straight course other than sudden momentary deviations; comprising a carrying frame, a gyroscope frame having diametrically opposite knife-edge trunnions, bearings in said carrying frame to support said trunnions, a low speed gyro-wheel, means for carrying said gyro-wheel within said gyroscope frame with its axis of rotation at right angles to the trunnions of said gyroscope frame, means for rotating said gyro-wheel, a graduated scale on said carrying frame, a pointer fixed to said gyroscope frame to indicate changes in direction on said graduated scale, means operable by the pilot to increase or decrease the gyroscopic sensitiveness of the apparatus comprising a cylinder secured to and pendent from said gyroscope frame below the axis of the trunnions thereof, a weight slidable within said cylinder, a supporting member, a flexible connection connecting said supporting member and said weight by which the latter is suspended, means operable by the pilot for adjusting said supporting member to raise or lower said weight in said cylinder, and means for opposing in a variable degree gyroscopic reactions of the gyroscope frame due only to sharp or sudden changes of direction.

9. A gyroscopic apparatus for navigation purposes adapted to indicate the smallest deviation from the straight course other than sudden momentary deviations; comprising a carrying frame, a gyroscope frame having diametrically opposite knife edge trunnions, bearings in said carrying frame to support said trunnions, a low speed gyro-wheel, means for carrying said gyro-wheel within said gyroscope frame with its axis of rotation at right angles to the trunnions of said gyroscope frame, means for rotating said gyro-wheel, a graduated scale on said carrying frame, a pointer fixed to said gyroscope frame to indicate changes in direction on said graduated scale, means operable by the pilot in connection with said gyroscope frame to raise or lower the centre of gravity of the frame and gyro-wheel and correspondingly vary the gyroscopic sensitiveness of the apparatus, and means for opposing gyroscopic reactions of the gyroscope frame due only to sharp or sudden changes of direction comprising a cylinder fixed on said carrying frame, a piston loosely fitting therein, a piston rod, an arm projecting from the gyroscope frame, and a pivotal connection between said arm and said piston rod.

10. A gyroscopic apparatus for navigation purposes adapted to indicate the smallest deviation from the straight course other than sudden momentary deviations; comprising a carrying frame, a gyroscope frame having diametrically opposite trunnions, bearings in said carrying frame to support said trunnions, a low speed gyro-wheel, means for carrying said gyro-wheel within said gyroscope frame with its axis of rotation at right angles to the trunnions of said gyroscope frame, means for rotating said gyro-wheel, a graduated scale on said carrying frame, a pointer fixed to said gyroscope frame to indicate changes in direction on said graduated scale, pendulum means vertically adjustable by the pilot in connection with said gyroscope frame to increase or decrease the gravitational control and correspondingly vary the gyroscopic sensitiveness of the apparatus, and means for opposing in a variable degree gyroscopic reactions of the gyroscope frame due only to sharp or sudden changes of direction, comprising a cylinder closed at its lower end and fixed on said carrying frame and having an enlarged internal diameter at about its central part, a piston loosely fitting therein, an upwardly extending piston rod, an arm projecting from the gyroscope frame, a pivotal connection between said arm and said piston rod, said cylinder having a passage through its wall below said piston, and a valve to control said passage to vary the resistance to movement of said piston.

In witness whereof I have hereunto set my hand.

PETER SCHILOVSKY.